United States Patent [19]
Konrad

[11] 3,801,796
[45] Apr. 2, 1974

[54] SYNCHRONIZATION SCHEME

[75] Inventor: Charles E. Konrad, Roanoke, Va.

[73] Assignee: General Electric Company, Salem, Va.

[22] Filed: Oct. 30, 1972

[21] Appl. No.: 302,351

[52] U.S. Cl. .................................................. 307/87
[51] Int. Cl. .............................................. H02j 3/08
[58] Field of Search .......... 307/87, 57; 328/72, 133, 328/134; 235/151.21

[56] References Cited
UNITED STATES PATENTS
| | | | |
|---|---|---|---|
| 3,493,778 | 2/1970 | Cutler et al. | 307/87 |
| 2,929,941 | 3/1960 | Bobo | 307/87 |
| 3,723,888 | 3/1973 | Ellis | 328/134 |

Primary Examiner—Herman Hohauser
Attorney, Agent, or Firm—Arnold E. Renner; Harold H. Green, Jr.

[57] ABSTRACT

In a control system for automatically synchronizing and effecting connection of a power generator to an operating power line, means are provided for sensing differences in certain frequency and phase parameters existing between the output signal of the power generator and the signal on the operating power line and thereafter generating control signals for affecting the speed of the power generator to cause any differences existing between those frequency and phase parameters to fall within defined tolerable limits. When those defined tolerable limits are achieved, means are provided for generating and transmitting a control signal to effect connection of the power generator to the operating power line.

15 Claims, 9 Drawing Figures

SYNCHRONIZATION TRUTH TABLE

| SCOPE | | SCOPE RATE | | | PHASE ANGLE | | SYNC |
|---|---|---|---|---|---|---|---|
| POS | NEG | LO | OK | HI | LESS THAN 20° | GREATER THAN 20° | OK |
| 0 | 1 | 1 | 0 | 0 | 1 | 0 | 0 |
| 0 | 1 | 1 | 0 | 0 | 0 | 1 | 0 |
| 0 | 1 | 0 | 1 | 0 | 1 | 0 | 0 |
| 0 | 1 | 0 | 1 | 0 | 0 | 1 | 0 |
| 0 | 1 | 0 | 0 | 1 | 1 | 0 | 0 |
| 0 | 1 | 0 | 0 | 1 | 0 | 1 | 0 |
| 1 | 0 | 1 | 0 | 0 | 1 | 0 | 1 |
| 1 | 0 | 1 | 0 | 0 | 0 | 1 | 0 |
| 1 | 0 | 0 | 1 | 0 | 1 | 0 | 1 |
| 1 | 0 | 0 | 1 | 0 | 0 | 1 | 0 |
| 1 | 0 | 0 | 0 | 1 | 1 | 0 | 0 |
| 1 | 0 | 0 | 0 | 1 | 0 | 1 | 0 |

FIG. 1

SYNCHRONIZATION SCHEME

Background of the Invention

The present invention relates generally to a control system for a power generator and more particularly to a system for effecting automatic synchronization and safe connection of the output of a power generator to an operating power line of a power distribution network.

The power distribution networks which stretch across many parts of this country generally include a number of satellite power generators which are connected and disconnected periodically to augment power being fed to a main power line as the power demands increase and decrease respectively in various parts of the networks. In view of the large power transfers in question, however, certain parameters of the power generator output signal and the operating power line signal must be within defined, tolerable limits of each other before connection of the power generator to the operating power line is attempted. The subject invention is concerned with two of these parameters, namely, phase and frequency. Means are provided for insuring that the phase angle between the power generator output signal and the operating power line signal are within a defined, safe phase angle difference from each other. Furthermore, additional means insure that the frequency of the power generator output signal is of a higher magnitude than the frequency of the operating power line signal, and also, that the difference in frequency between the two signals is within certain defined limits of each other; otherwise, disastrous and costly consequences would result when an attempt at connection was made. For this reason, the prior art has provided a somewhat involved scheme including at least one very expensive relay, as well as the need for an operator to be present to insure alignment of the necessary signal parameters of the power generator output with those signal parameters on the operating power line before a safe connection of the power generator output to the operating power line can be made.

Summary of the Invention

The present invention provides an automatic control system for safely and economically effecting synchronization and connection of a power generator or first alternating current source into an operating power line or second alternating current source. In particular, in a preferred embodiment of the invention there is disclosed means for sensing corresponding frequency and phase parameters of a power generator and an operating power line, including means for comprising certain aspects of these parameters with each other to determine if they fall within defined, allowable differences. If they do fall within the allowable differences a synchronization signal is provided which would permit connection of the power generator into the operating power line. If the compared frequency and phase parameters do not fall within the allowable differences, signals are provided to the power generator for causing it to change its frequency-phase relationship with that of the operating power line so as to meet the connection requirements.

The system disclosed in the preferred embodiment includes circuits for monitoring the frequency and phase parameters so as to insure that connection of the power generator to the operating power line is attempted only when the following three conditions are met: first, the phase angle existing between the frequency of the power generator output signal and the frequency of the operating power line signal must be less than 20°; second, the frequency of the power generator output signal must be higher than the frequency of the operating power line signal; and third, the frequency of the power generator output signal must be no more than .33 Hz greater than the frequency of the operating power line.

The preferred embodiment further includes means responsive to each of the circuits monitoring the three above-mentioned parameters such that when coincidence with all three circuits is achieved, a synchronization signal is generated and transmitted to the proper circuit effecting connection of the power generator to the operating power line.

It is, therefore, an object of the present invention to provide a safe, economical means for automatically effecting connection of a first alternating current source to a second alternating current source.

Another object is to provide means for comparing certain parameters of an output signal from a first alternating current source to corresponding parameters of a signal from a second alternating current source for the purpose of determining if connection of the first alternating current source to the second alternating current source can be safely made.

Still another object is to provide means for comparing certain parameters of an output signal from a first alternating current source to corresponding parameters of a second alternating source for the purpose of determining if connection of the first alternating source to the second alternating current source can be safely made, and if connection thereof cannot be safely made, means are provided for varying those parameters of the first alternating current source until a safe connection can be made.

These and other objects of the subject invention will become apparent from the detailed description of the specification including the accompanying drawings.

Description of the Drawings

FIG. 1 is a truth table relating to the operation of the present invention.

Description of the Preferred Embodiments

Figure 2:
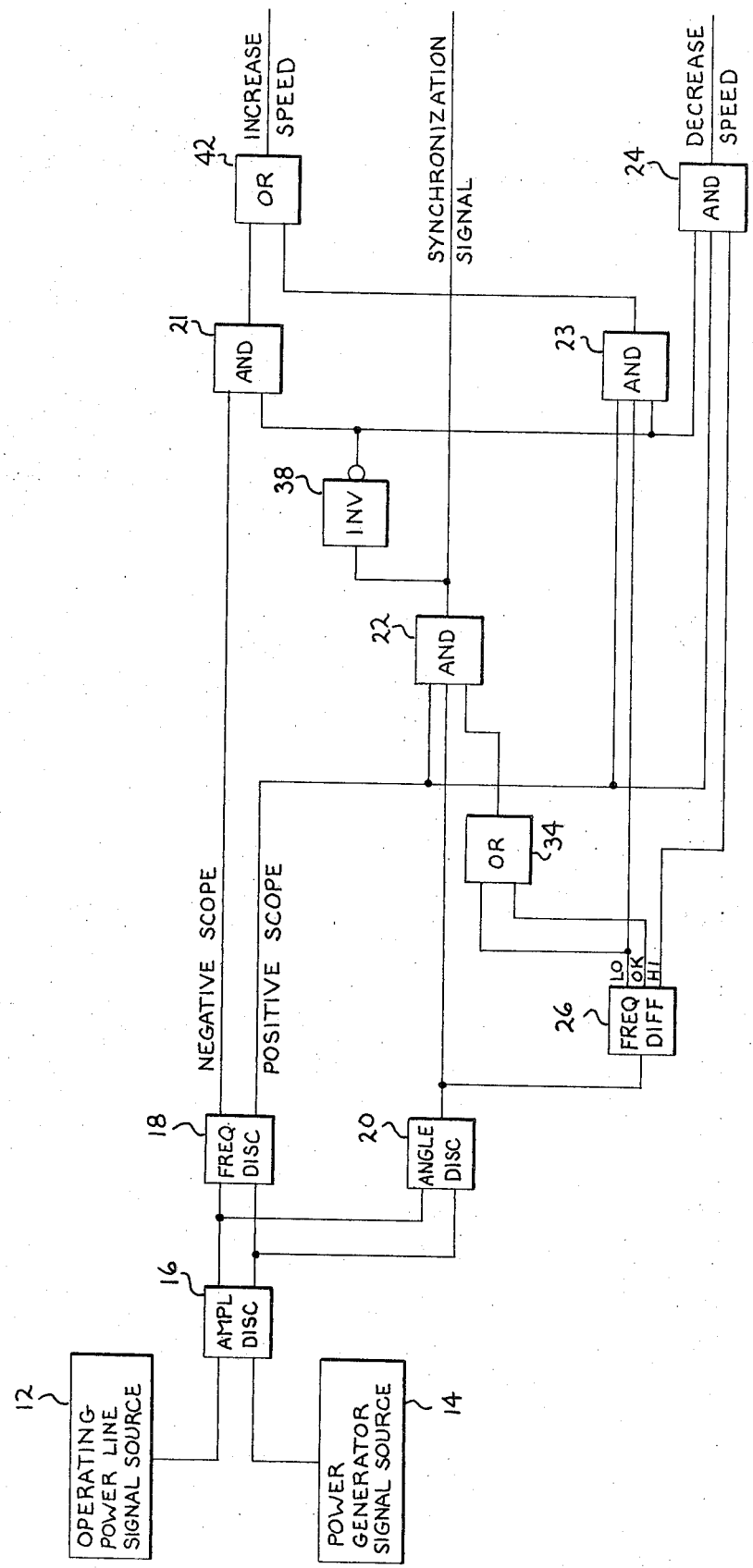
FIG. 2 is a basic functional block diagram of the system of the present invention.

To facilitate understanding of the invention, the problem to be solved should be clearly understood at the outset. The task presented is that of connecting a first alternating current source to a second alternating current source. In a preferred embodiment of the present invention the task is more narrowly presented as connecting a power generator, especially a gas turbine generator, to an operating power line for the purpose of augmenting the power on the power line. It will be understood, of course, that a much broader scope of application is contemplated. However, in referring to the preferred embodiment, in order to accomplish the task of safely connecting a power generator into an operating power line, certain parameters relative to the frequency and phase of the signals from both the power generator and the operating power line must be within defined, allowable deviations from each other. The first condition that must be satisfied before connection may be safely made demands that the frequency of the power generator output signal be higher than the generally 60 Hz frequency of the operating power line signal. Such a frequency relationship is termed a positive scope. When the frequency of the generator power line signal is higher than the frequency of the power generator output signal, the situation is termed a negative scope, and under this condition, connection of the power generator to the operating power line cannot be safely made. A second condition that must be met before connection may be safely made concerns another parameter relative to the two signals, namely that of phase angle. In order to safely connect the power generator into the operating power line, at the time of connection the phase angle difference between the two signals must be no greater than 20°. And finally, a third condition that must be met before connection may be safely made requires that the difference in frequency between the two signals at the time connection is attempted must be no greater than .33 Hz. This difference in frequency between the two signals is generally regarded as the scope rate and is usually expressed in terms of time rather than frequency, and a frequency difference of .33 Hz would correspond to a 3 second scope rate.

Thus, unless these three conditions outlined above are met, any attempted connection of the power generator into the operating power line will result in an unsafe condition which, in most systems, will cause protective relays to open and thwart the attempted connection.

The invention, however, provides means for sensing the phase and frequency parameters of the power generator and operating power line, and if the parameters are within the defined acceptable limits such that the three conditions are met, either an indicating means will respond to the satisfied conditions and provide an indicating signal thereof, or else, as shown in the preferred embodiment a synchronization signal will be developed and transmitted to a circuit for effecting the connection of the power generator output to the operating power line. If the necessary conditions are not satisfied, the system includes additional means for determining whether the frequency of the power generator should be increased or decreased so as to bring the frequency or phase angle within the allowable difference limits and thereby permit connection of the power generator to the operating power line.

As a further aid in understanding the system operation, reference is first made to FIG. 1 of the drawings which discloses a synchronization truth table of the entire system. Examination of that table, which includes four principle columns titled SCOPE, SCOPE RATE, PHASE ANGLE and SYNC, indicates that safe connection of the power generator to the operating power line is only permissible during the two conditions which are represented by a logic one in the SYNC column. As discussed above, those two conditions exist only when there is a positive scope, which would be indicated in the truth table of FIG. 1 by a logic one under the first sub-column of the SCOPE column, entitled POS; a phase angle of less than 20°, as indicated by a logic one in the first sub-column of the phase angle column, entitled LESS THAN 20°; and a scope rate of less than 5 seconds as indicated by a logic one in the first or second sub-columns of the SCOPE RATE column entitled LO and OK respectively. The presence of a logic one in the OK sub-column indicates that the scope rate is less than 5 seconds which is within the acceptable limits required to allow generator connection. The presence of a logic one in the LO sub-column is indicative of a SCOPE RATE of less than 3 seconds, which is also an acceptable frequency difference to permit generator connection, but as will be brought out more clearly in the explanation to follow, under those conditions, when the phase angle difference is greater than 20°, the particular control signal that will be sent to the power generator so as to cause it to increase or decrease its frequency, will depend upon whether there is a 3 or 5 second scope rate.

Referring to FIG. 2 of the drawings, a complete system is disclosed for comparing a power generator output signal with an operating power line signal for the purpose of determining if connection of the generator to the power line is feasible. An operating power line or first alternating current signal source 12, from a power distribution network (not shown), and a power generator or second alternating current signal source 14 provide sinusoidal or sine wave signals to an amplitude discriminator circuit 16. The amplitude discriminator circuit converts the sine wave signals into positive going square wave signals which are then coupled from the amplitude discriminator circuit 16 to both frequency discriminator circuit 18 and an angle discriminator circuit 20.

Referring first to frequency discriminator circuit 18, a pair of separate output signals are taken therefrom, one of which, indicative of a negative scope, is fed to a first AND gate 21, the other of which, indicative of a positive scope, is provided as an input to three additional AND gates, 22, 23 and 24. A single output is taken from angle discriminator circuit 20 providing the only input to a frequency differentiator circuit 26 and a second input to AND gate 22. Frequency differentiator circuit 26 generates three outputs: a LO signal; and OK signal and a HI signal. The LO signal provides a second input to AND gate 23 and a first input to an OR gate 34, a second input to which OR gate is provided by the OK signal. OR gate 34 generates a single output signal in response to the presence of either the LO or OK signal from frequency differentiator circuit 26, to provide an output signal which serves as a third input to AND gate 22. The HI signal from frequency differentiator circuit 26 is introduced as the second of three inputs to AND gate 24, the third of which being an inverted output from AND gate 22. An inverter circuit 38 tied to the output of AND gate 22 provides the necessary inversion. The inverted output from inverter circuit 38 also provides a second input to AND gate 21 and a third input to AND gate 23.

The outputs from AND gates 21 and 23 are fed to a second OR gate 42 which, when enabled, transmits a signal to the power generator for the purpose of causing the power generator to increase speed, and hence, increase frequency. On the other hand, when AND gate 24 is enabled, a different signal is transmitted to the power generator for the purpose of causing the power generator to decrease speed, and hence, decrease frequency. When the required inputs necessary to enable either OR gate 42 or AND are not present, AND gate 22 provides an uninverted synchronization signal to the power generator indicating that all of the monitored conditions necessary to allow generator connection to the operating power line have been met. The proper circuitry, not a part of this invention, will then cause the power generator to be connected into the operating power line.

Figure 3:
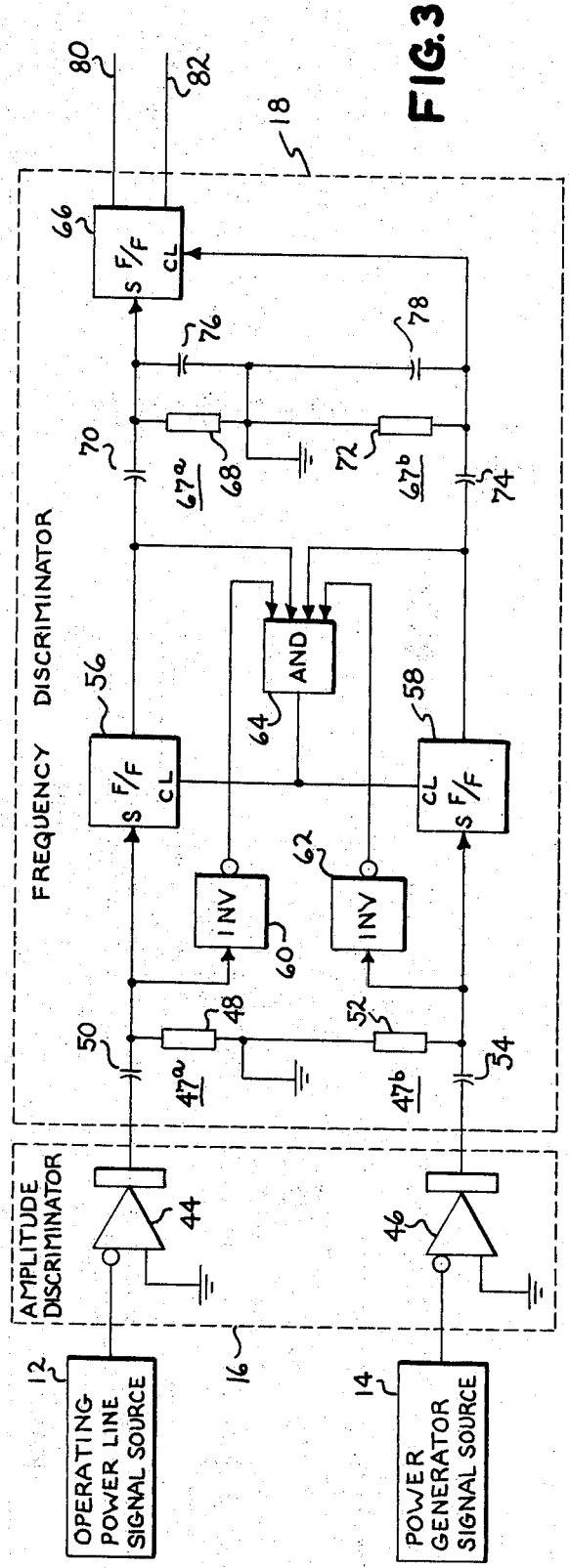
FIG. 3 is a block diagram of the frequency discriminator circuit employed in the illustrated embodiment of the present invention.

Reference is now made to FIG. 3 of the drawings which discloses a more detailed representation of the amplitude discriminator circuit 16 and frequency discriminator circuit 18. Amplitude discriminator circuit 16 includes a pair of squaring circuits 44 and 46, which receive respectively the operating power line and power generator signals in sine wave form from corresponding sources 12 and 14. The squaring circuits provide square wave input signals to frequency discriminator circuit 18. Frequency discriminator circuit 18 receives the two input signals from amplitude discriminator circuit 16 through a pair of grounded differentiating networks, 47a and 47b, one of which, namely 47a includes resistor 48 and capacitor 50, the other of which, namely 47b, includes resistor 52 and capacitor 54. The differentiating networks 47a and 47b convert the square wave signals into trigger pulses to provide inputs to the set terminals of a pair of storage cells or bistable multivibrators (flip flops) 56 and 58 respectively, as well as inputs to a pair of inverter circuits 60 and 62 respectively. An output from each of the inverter circuits 60 and 62, as well as signals from each of the flip flops 56 and 58 are provided as inputs to an AND gate 64 which, when enabled, feeds a single output pulse back to the clear terminals of each of the aforementioned flip flops. The purpose of using the outputs from the inverter circuits as additional inputs to AND gate 64 is to insure against possible "race" conditions which might occur in the operation of the flip flops.

The output signals from flip flops 56 and 58 are also provided as inputs to the set and clear terminals respectively of a third storage cell or flip flop 66. Interposed between the outputs from flip flops 56 and 58, and the inputs to the set and clear terminals of flip flop 66 are a second pair of differentiating networks 67a and 67b. The first named differentiating network, 67a, includes a resistor 68 and a capacitor 70 and feeds the set terminal of flip flop 66, while the second named differentiating network, 67a, includes a resistor 72 and a capacitor 74 and feeds the clear terminals of that flip flop. These networks are provided for converting the pulse outputs from flip flops 56 and 58 into usable trigger pulses. Additional capacitors 76 and 78 tied respectively between the set and clear terminals and ground, are provided for the purpose of bypassing spike pulses generated by either flip flop 56 and 58 during certain periods of circuit operation. Finally, flip flop 66 provides a pair of output signals from terminals 80 and 82 representing the polarity of the scope of operation. A logic one output on terminal 80 would indicate a negative scope while a logic one output on terminal 82 would represent a positive scope.

Figure 5:
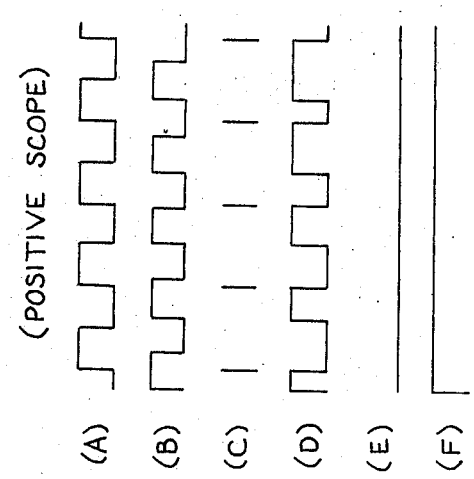
FIGS. 5(A) through 5(F) are a series of waveforms relating to the operation of the discriminator circuit of FIG. 3 under a condition of positive scope.
Figure 4:
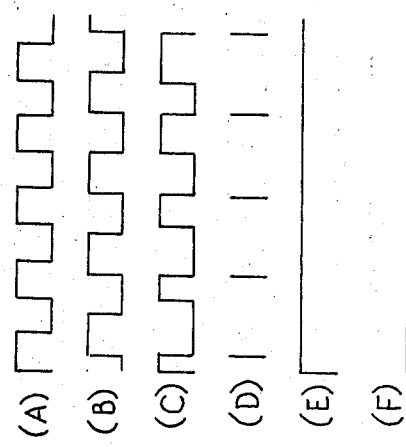
FIGS. 4(A) through 4(F) are a series of waveforms relating to the operation of the frequency discriminator circuit of FIG. 3 under a condition of negative scope.

Referring now to FIGS. 4 and 5 of the drawings, each include waveforms (A) through (F) representing various signals associated with frequency discriminator circuit 18 under two sets of circumstances. Those circumstances are in one case, as in FIG. 4, when the operating power line frequency is greater than the power generator output frequency, or a negative scope; and in the other case, as in FIG. 5, when the operating power line frequency is less than the generator output frequency, or a positive scope. The waveforms (A) through (F) of both FIGS. 4 and 5 represent the following outputs: waveform (A) represents an output signal from squaring circuit 44, while waveform (B) represents an output signal from squaring circuit 46. Waveform (C) represents an output signal from flip flop 56, while waveform (D) represents an output signal from flip flop 58. Waveforms (E) and (F) represent the signals which would appear on lines 80 and 82, respectively, of flip flop 66.

Figure 6:
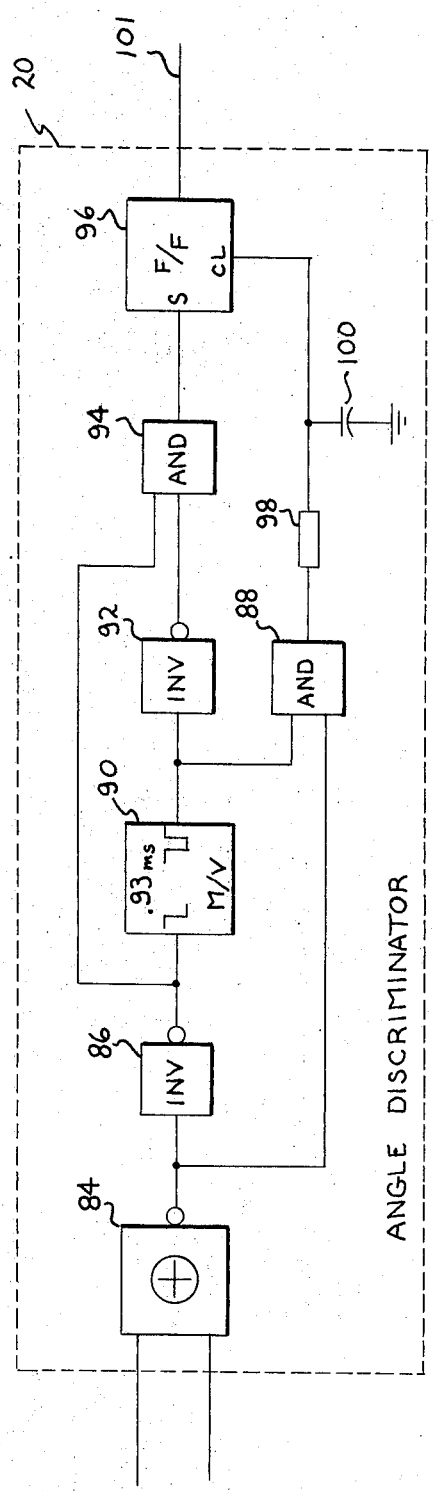
FIG. 6 is a block diagram of the angle discriminator circuit employed in the illustrated embodiment of the present invention.

Reference is now made to FIG. 6 which discloses the angle discriminator circuit 20 in greater detail. The circuit includes a first logic means such as exclusive OR gate 84 having provided thereto a pair of square wave input signals representing the operating power line and power generator signals from amplitude discriminator circuit 16. The output from exclusive OR gate 84 is fed to an inverter circuit 86 and an AND gate 88. Inverter circuit 86 sends a trigger pulse to a timing means such as monostable multivibrator 90 which generates a timing pulse having a .93 millisecond (ms) timing pulse width. The output of multivibrator 90 is inverted by a second inverter circuit 92, which inverted output serves as a first input to a second logic means or AND gate 94. The .93 ms timing pulse width of the timing pulse is arrived at by considering that at the general operating frequency of 60 Hz, the phase angle of concern which is 20°, is equal in time to .93 ms.

A second input to AND gate 94 is taken from the output of inverter circuit 86 while an uninverted output from the monostable multivibrator serves as a second input to AND gate 88. AND gate 94 provides an input to the set terminal of an angle discriminator storage cell, or bistable multivibrator (flip flop) 96, the clear terminal of which has an input signal introduced from AND gate 88 through a resistor 98 of an RC network which includes in addition to the resistor, a capacitor 100 tied between the clear terminal of flip flop 96 and ground potential. The purpose of the RC network is to shape the pulse input being fed to the clear terminal of flip flop 96. An output from angle discriminator circuit 20 is obtained on line 101.

Figure 7:
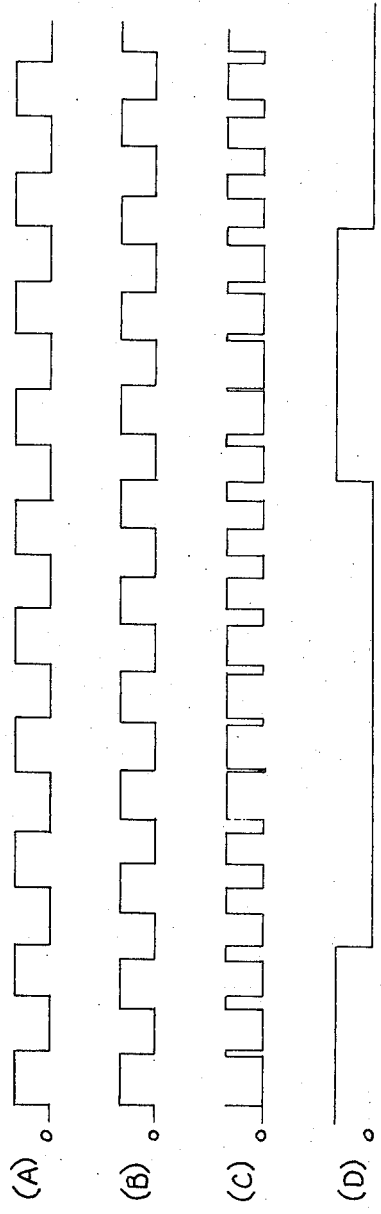
FIGS. 7(A) through 7(D) are a series of waveforms relating to the operation of the angle discriminator circuit of FIG. 6.

Referring to FIG. 7 of the drawings which includes waveforms (A) through (D), waveform (A) is representative of the lower of the operating power line and power generator frequencies introduced into exclusive OR gate 84, while waveform (B) represents the higher of the two frequencies. Waveform (C) is representative of an output signal from exclusive OR gate 84, while waveform (D) represents an output signal from flip flop 96 appearing on line 101.

Figure 8:
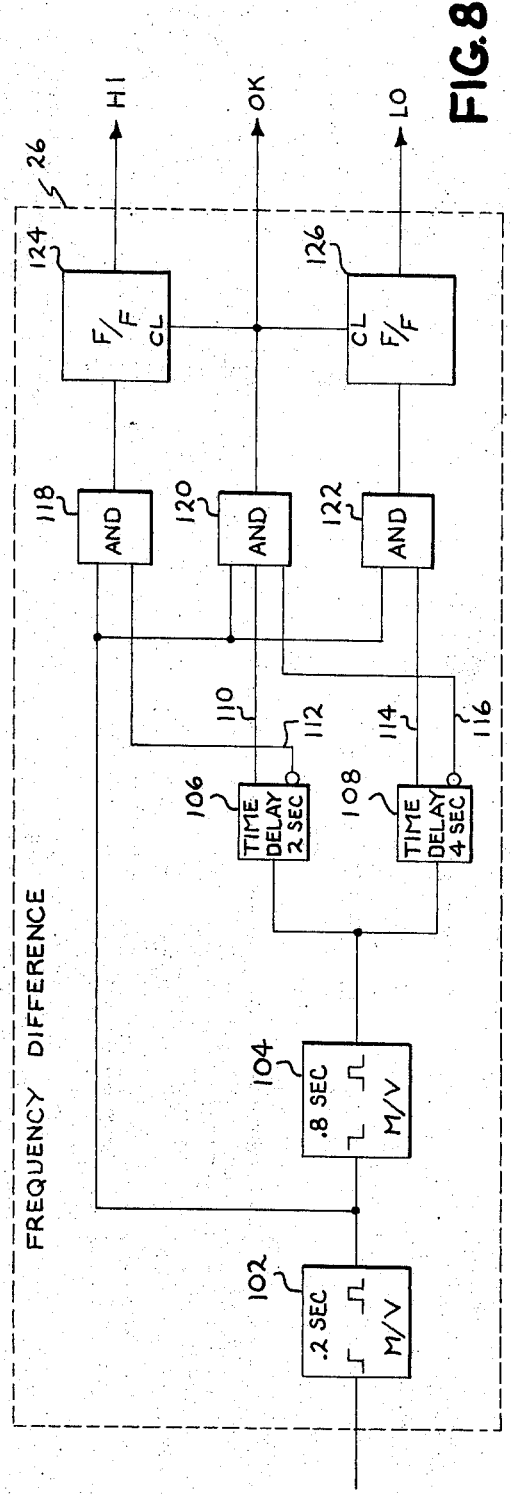
FIG. 8 is a block diagram of the frequency difference circuit employed in the illustrated embodiment of the present invention.
Figure 9:
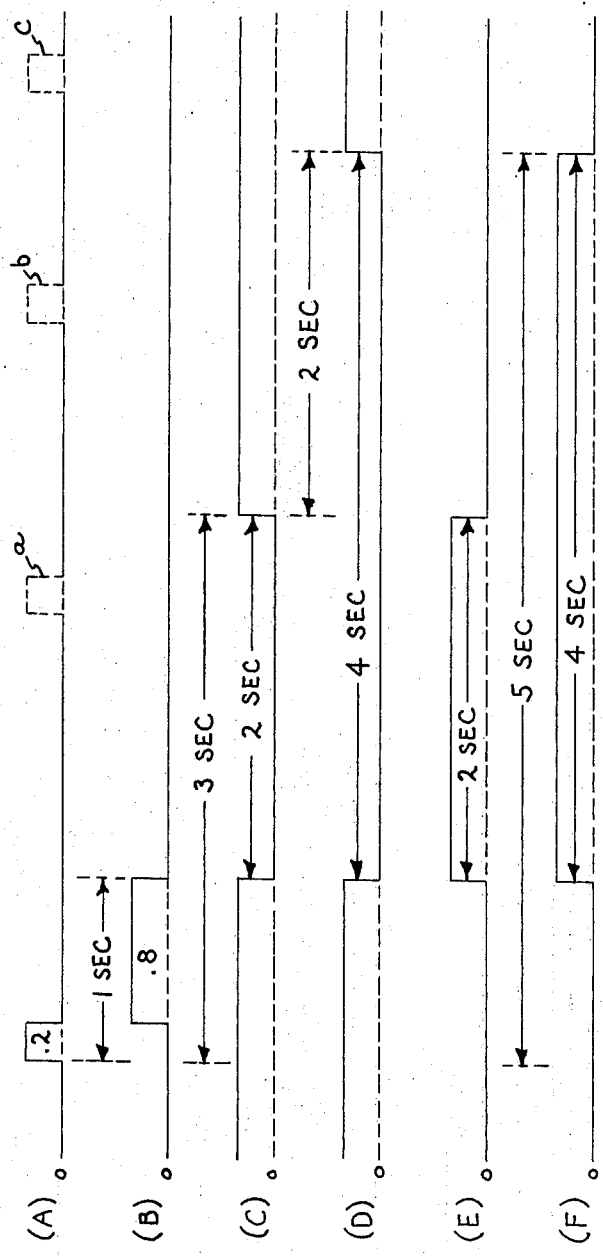
FIGS. 9(A) through 9(F) are a series of waveforms relating to the operation of the angle discriminator circuit of FIG. 8.

Referring now to FIGS. 8 and 9 of the drawings, a more detailed disclosure of the frequency difference circuit 26 is shown in FIG. 8, while FIG. 9, reveals certain representative waveforms associated with that circuit. the single input to frequency difference circuit 26 provided from angle discriminator circuit 20 is applied to a first trigger means such as monostable multivibrator 102 which generates as an output signal, a single read pulse lasting .2 second in duration as indicated by waveform (A) of FIG. 9. Recurring read pulses from multivibrator 102 are shown as broken-line or phantom pulses a, b and c of that same waveform. The output from multivibrator 102 is fed to a second trigger means such as monostable multivibrator 104 which generates a longer reset pulse lasting .8 second in duration as represented by waveform (B) of FIG. 9. The output from multivibrator 104 provides an input to a pair of 2 and 4 second time delay means 106 and 108, respectively. Time delay means 106, which includes output terminals 110 and 112, provides a pair of time delay signals of opposite polarity as shown representatively by waveforms (C) and (E) respectively of FIG. 9. Time delay means 108, which includes output terminals 114 and 116, also provides a pair of time delay signals of opposite polarity as shown representatively by waveforms (D) and (F), respectively, of FIG. 9. Frequency difference circuit 26 also includes three AND gates or switch means, 118, 120 and 122. AND gate 118 receives one input from multivibrator 102, and a second input from terminal 112 of time delay means 106. AND gate 120 has provided thereto, three inputs, one from multivibrator 102, another from terminal 116 of time delay means 108 and a third from line 110 of time delay means 106. Finally, AND gate 122 receives two inputs, one from terminal 114 of time delay means 108, and the other from multivibrator 102.

AND gates 118 and 122 provide the LO and HI signals respectively to OR gate 34 and AND gate 24 (shown in FIG. 2) through a pair of flip flops 124 and 126, while AND gate 120 provides clear signals to those flip flops as well as the OK signals to OR gate 34.

Operation of the system will now be described by initially overviewing the complete operation of the system and then examining each circuit in more detail. Referring then to FIG. 2 of the drawings, it is seen that the signals from signal sources 12 and 14, representing signals from the operating power line and the power generator, respectively, are introduced as sinusoidal signals of generally different amplitudes and frequencies into the amplitude discriminator circuit 16. The amplitude discriminator circuit serves to convert the sinusoidal signals into positive going square waves of equal amplitude while still preserving the frequency and phase differences existing between the signals prior to the introduction thereto. The square waves are subsequently transmitted to the frequency discriminator circuit 18 and the angle discriminator circuit 20. The purpose of the frequency discriminator circuit is to determine if the frequency of the generator output is higher (positive scope) or lower (negative scope) than the frequency on the operating power line. If a negative scope is detected, a signal will be developed by the frequency discriminator circuit which, upon certain other conditions being true, will increase the speed of the power generator causing the frequency of the power generator to increase and thereby approach a positive scope. When a positive scope is achieved, the single to the generator causing it to increase speed will be terminated.

Assuming then a positive scope, which is required to allow safe connection of the power generator output to the operating power line, it is next required that the phase angle existing between the two frequencies be less than 20° at the time connection of the power generator to the operating power line is made. It should be noted at this point that since the frequencies of the two signals are generally different, the phase angle existing between them at any time will vary from 0° to 180° over a period of time depending on the magnitude of the existing frequency difference. The angle discriminator circuit 20 senses the phase angle difference between the input signals, and for those periods of time during which the phase angle existing between the frequencies is less than 20°, a signal confirming that fact is generated and transmitted to AND gate 24. Upon other conditions being met, AND gate 24 provides a synchronization signal for causing a connection of the power generator to the operating power line to be made.

The frequency difference circuit 26 which receives the signal generated by angle discriminator circuit 20 utilizes that received signal to determine the frequency difference, or scope rate, existing between the operating power line and the power generator output. The frequency difference circuit 26 includes means for determining whether the frequency difference between the operating power line and power generator output lies within or outside of the range of .2 Hz to .33 Hz. Expressed in terms of time, this is equal to a 5 second scope rate and a 3 second scope rate, respectively. If the frequency difference is greater than .33 Hz (less than a 3 second scope rate) a control signal is generated and transmitted to cause the power generator to decrease speed. If the frequency difference is less than .33 Hz (greater than a 3 second scope rate), a confirming signal is transmitted through OR gate 34 to a gating means such as AND gate 22 which, assuming a positive scope and a phase angle difference of less than 20°, transmits a synchronization signal to effect connection of the power generator to the operating power line. It should be noted here, that since the phase angle difference or the frequency difference between the operating power line and the power generator output is meaningless unless the polarity of the scope rate is positive, the system will not react to any signals from the angle discriminator circuit 20 or the frequency difference circuit 26 unless there is a positive scope as signaled from the frequency discriminator circuit 18.

If the frequency difference is less than .2 Hz, the power generator output may still be connected to the operating power line if the other two frequency parameters, namely scope polarity and phase angle, are proper and within the tolerable limits. However, assuming that there is a positive scope as required, if the phase angle below the operating power line and the power generator signals is greater than 20°, a control signal will be transmitted to cause the power generator to increase speed and thereby bring the phase angle within the required 20° phase angle more quickly than it would have occurred at the slower speed.

A closer examination into the operation of amplitude discriminator circuit 16 and the frequency discriminator 18 will now be considered. Referring to FIGS. 3, 4 and 5 of the drawings, the sine wave signals from operating power line signal source 12 and power generator output signal source 14, are introduced respectively into the input terminals of the squaring circuits 44 and 46 included within amplitude discriminator 16. The squaring circuits operate on the respective input signals to convert them into positive going square waves of equal amplitude while still retaining any difference in frequency and phase originally associated therewith. The difference in frequency between the two signals is, as stated earlier, indicative of the polarity of the scope; a higher generator output frequency being labeled a positive scope, a lower generator output frequency being labeled a negative scope.

In studying the operation of the frequency discriminator circuit 18, which circuit determines the polarity of the scope, reference is made to FIG. 4 which reveals the waveforms associated wih the circuit during a condition of negative scope. Waveform (A) of that figure, being of a higher frequency than waveform (B), would be representative of the operating power line frequency. That signal would be fed through squaring circuit 44 and used to set flip flop 56. Waveform (B) of FIG. 4, which is a lower frequency than that of waveform (A), is representative of the power generator output frequency. That signal is fed through squaring circuit 46 of the amplitude discriminator circuit 16 and used to set flip flop 58. As indicated by waveforms (C) and (D), of FIG. 4 which represent the output waveforms of flip flops 56 and 58, respectively, during a condition of negative scope flip flop 56 generates a positive going square wave signal, while flip flop 58 generates only positive going spike pulses. A study of the circuit and the timing of the related waveforms will show that this result follows. Since flip flop 56 receives the higher frequency during a period of negative scope, it is set by a positive going portion of the higher frequency, and is cleared by a clear pulse from AND gate 64 which clear pulses are generated only after receiving a positive going portion of the later occurring lower frequency signal. Thus, a period of time will elapse between the setting and clearing of flip flop 56. This period of time is the pulse width of the square wave as represented by waveform (C) of FIG. 4. On the other hand, flip flop 58 which receives a lower frequency signal during a condition of negative scope, generates only spike pulses out. This also follows since flip flop 58 is cleared almost immediately after it is set because the pulse that sets that flip flop is actually the same pulse that is used to derive the pulse from AND gate 64 used to clear that same flip flop.

With respect to positive scope, reference is made to FIG. 5. There it is seen that waveform (A) is a lower frequency than waveform (B) and represents the operating power line signal during a condition of positive scope. Waveform (B), being a higher frequency, is representative of the generator output frequency during a positive scope condition. In this instance of positive scope, the above-described reasoning for negative scope would be completely reversed for the flip flops 56 and 58. Flip flop 56 would generate the spike pulse while flip flop 58 would generate a square wave output signal.

Thus, during a condition of negative scope, flip flop 56 will generate a positive going square wave signal as represented by waveform (C) of FIG. 4. Flip flop 58 will generate positive going spike pulses as represented by waveform (D) of that same figure. As a result, flip flop 66 is set by the positive going square waves from flip flop 56. And since the spike pulses from flip flop 58 are shorted to ground through properly sized capacitor 78, flip flop 66 will remain set for as long as the operating power line frequency is greater than the power generator frequency. Flip flop 66 will generate a logic one output signal on line 80, and a logic zero output signal on line 82. These output signals are represented respectively by waveforms (E) and (F) of FIG. 4.

During a condition of positive scope, flip flop 58 will generate a positive going square wave as represented by waveform (D) of FIG. 5. Flip flop 56 will generate positive going spike pulses as represented by waveform (C) of that same figure. Flip flop 66 will therefore be cleared by th positive going square waves from flip flop 58 and will remain cleared as long as there exists a positive scope. This result must follow since the spike pulses, as represented by waveform (C) of FIG. 5, will be shorted to ground through capacitor 76, the value of which capacitor is is chosen so as to perform that function. Flip flop 66 will generate a logic zero output in response to these conditions on line 80, and a logic one output on line 82. These output signals are represented by waveforms (E) and (F), respectively, of FIG. 5.

Reference is now made to FIGS. 6 and 7 which disclose the angle discriminator circuit 20, and waveforms relating to the operation thereof, respectively. Waveforms (A) and (B) of FIG. 7, shown arbitrarily in a condition of positive scope, represent respectively the operating power line and power generator output signals fed from amplitude discriminator circuit 16. The signals are introduced into the angle discriminator circuit 20 through exclusive OR gate 84, which gate responds to the two input signals by generating a first intermediary signal, indicated by waveform (C) of FIG. 7. The width of each pulse of the first intermediary signal is representative of the phase angle difference existing between the waveforms (A) and (B) of that same figure. The output of the angle discriminator circuit 20, shown as waveform (D) of FIG. 7, is taken from line 101 of flip flop 96, and includes a positive going portion or phase angle signal which will persist for as long as the phase angle existing between the operating power line signal and the power generator output signal is less than 20°.

In examining the angle discriminator circuit 20 in more detail, it is seen that the positive going output pulses of the first intermediary signal from exclusive OR gate 84 are introduced as inputs to both AND gate 88 and inverter circuit 86. In this latter circuit, the first intermediary signal is converted into an inverted first intermediary signal having negative going pulses and used to feed monostable multivibrator 90 and the AND gate 94. On the lagging or positive going edge of the inverted first intermediary signal from inverter circuit 86, multivibrator 90 is triggered, thereby causing a timing pulse, .93 ms in duration to be fed to inverter circuit 92 and to AND gate 88, the latter being enabled to generate a clear pulse whenever both the timing pulse and the first intermediary signal are received. The timing pulse to inverter circuit 92 is converted into an inverted timing pulse and fed to AND gate 94, which AND gate is enabled to generate a second intermediary signal whenever the inverted first intermediary signal from 86 is also received therewith. And since AND gate 94 is tied to the set terminal of flip flop 96, and AND gate 88 is tied through resistor 98 to provide a third intermediary signal to the clear terminal of that same flip flop, the setting and clearing of that flip flop provides a measure of the pulse width of waveform (C). AND gate 94 sets flip flop 96 whenever the pulse width of waveform (C) is less than .93 ms in duration. Thus, as indicated by waveform (D) of FIG. 7, a logic one output pulse or phase angle signal lasting the duration of time during which the phase angle between the two frequencies is less than 20°, or .93 ms, is generated at the output of flip flop 96. During those periods when the phase angle difference is greater than 20° a logic zero is generated.

The output from angle discriminator circuit 20, however, is useful not only for indicating when the phase angle between the operating line and generator signals is less than 20°, but it is also used to determine the frequency difference existing between those two signals. Referring to FIGS. 8 and 9 of the drawings, it is seen that the output from angle discriminator circuit 20 is introduced into monostable multivibrator 102, of the frequency difference circuit 26, which multivibrator generates the read pulse .2 second in duration on the leading edge or positive going portion of the phase angle signal from the output of angle discriminator circuit 20. This read pulse, which is represented graphically by waveform (A) of FIG. 9, is fed to monostable multivibrator 104 which generates the reset pulse on the lagging edge of the read pulse from multivibrator 102. The reset pulse lasts .8 second in duration, and is represented by waveform (B) of FIG. 9 of the drawings. On the lagging edge of the reset pulse, the 2 and 4 second time delay means, 106 and 108 respectively, are initiated. Thus, since the angle discriminator circuit 20 cyclically generates successive output pulses which start at a precise phase angle relationship between the two compared frequencies (namely 20°), a measure of the time lapse between the successive output pulses will serve as an effective measurement of the frequency difference existing between the two signals. And since multivibrator 102 is triggered at the commencement of each pulse from the angle discriminator circuit 20 to generate a read pulse, a measure of the recurrence of those read pulses is, in effect, a measure of the frequency difference existing between the power generator and operating power line.

Referring to waveforms (A) and (E) of FIG. 9 representing, respectively, the read pulse from multivibrator 102 and the signal appearing on line 112, it is clear that the recurrence of a second pulse from multivibrator 102, within a period of 3 seconds from a previously occurring pulse from that multivibrator, will enable AND gate 118 which sets flip flop 124 to generate a difference signal indicative of a frequency difference between the operating power line and the power generator of greater than .33 Hz. The second recurring pulse from multivibrator 102 is indicated as phantom pulse (a) on waveform (A) of FIG. 9 of the drawings.

Assuming 5 seconds had elapsed before the recurrence of a read pulse from multivibrator 102, reference is now made to waveforms (A) and (D) representing, respectively, the recurring read pulse from multivibrator 102 and the signal appearing on line 114. A study of these waveforms should make it clear that a read pulse from multivibrator 102 recurring after 5 seconds had elapsed, as indicated by phantom pulse (c) of waveform (A), will enable AND gate 122 which sets flip flop 126 to permit another difference signal indicative of a frequency difference of less than .2 Hz to be generated.

Finally, assume a recurring read pulse from multivibrator 102 is received after 3 seconds, but before 5 seconds has elapsed. This pulse would be indicated by phantom pulse (b) of waveform (A). A study of waveforms (A), (C) and (F) will show that when a recurring read pulse is received at that time, AND gate 120 will be enabled and still another difference signal indicative of a frequency difference between the operating power line and power generator voltages of less than .33 Hz but greater than .2 Hz will be generated. The signal from AND gate 120 will clear flip flops 124 and 126 if either of them had been set by a signal from either AND gate 118 or 122.

Thus, where the outputs from AND gates 118 and 122 are utilized for setting flip flops 124 and 126 indicating, respectively, a high or low frequency difference between the operating power line and the power generator, the output from AND gate 120, when enabled, generates a signal for clearing flip flops 124 and 126, as well as indicating that the difference in frequency of the two signals is acceptable. Thus, a measure of frequency difference existing between the operating power line and the power generator is accomplished.

It is clear, therefore, that by the above-described invention, a control signal is obtained whereby the frequency of a power generator may be automatically synchronized to the frequency of an operating power line so as to permit safe connection of the generator voltage into the line voltage for the purpose of augmenting the power on the operating power line. The subject invention provides means for monitoring the scope, scope rate, and phase angle parameters of the two signals and includes further means for generating control signals to vary the frequency of the generator so as to cause that frequency to conform to certain, prescribed conditions of the monitored parameters.

While there is shown and described a specific embodiment of this invention, it will be understood that this invention is not limited to the particular construction shown and described, and it is intended by the appended claims to cover all modifications within the spirit and scope of this invention.

What is claimed as new and desired to be secured by Letters Patent of the United States is:

1. An indicating system for indicating whenever a signal from a first alternating current source is synchronized with a signal from a second alternating current source, said system comprising:

a. a frequency discriminator circuit responsive to the signals from said first and second sources to sense a difference in frequency between said signals and for producing a first output signal when the frequency of the first source signal is higher that that of the second, and a second output signal when the frequency of the second source signal is higher than that of the first;

b. an angle discriminator circuit responsive to the signals from said first and second sources to sense a phase angle difference and a frequency difference between said signals, and for generating a phase angle signal occurring during periods of time during which said phase angle difference is less than a predetermined value; said phase angle signal recurring at a rate proportional to said frequency difference between said signals;

c. a frequency difference circuit responsive to said recurring phase angle signals to sense a difference in frequency between said signals from said first and second sources, and including first switch means for passing a first difference signal whenever said difference in frequency between said signals from said first and second sources is less than a preselected value; and d. means responsive to said phase angle signal, said first output signal and said first difference signal to provide an indicating signal whenever said phase angle signal, said first output signal and said first difference signals are received.

2. The control system as recited in claim 1 wherein said phase angle signal is a pulse having a pulse width proportional to the period of time said phase angle difference is less than said predetermined value.

3. An indicating system for indicating whenever a signal from a first alternating current source is synchronized with a signal from a second alternating current source, said system comprising:

a. a frequency discriminator circuit responsive to the signals from said first and second sources to sense a difference in frequency between said signals and for producing a first output signal when the frequency of the first source signal is higher than that of the second, and a second output signal when the frequency of the second source signal is higher than that of the first;

b. an angle discriminator circuit responsive to the signals from said first and second sources to sense a phase angle difference and a frequency difference between said signals, and for generating a phase angle signal occurring during periods of time during which said phase angle difference is less than a predetermined value; said phase angle signal recurring at a rate proportional to said frequency difference between said signals;

c. a frequency difference circuit responsive to said recurring phase angle signals to sense a difference in frequency between said signals from said first and second sources, said frequency difference circuit including first switch means for passing a first difference signal whenever said difference in frequency between said signals from said first and second sources is less than a first preselected value; said frequency difference circuit including second switch means for passing a second difference signal whenever said difference in frequency between said signals from said first and said second sources is greater than a second preselected value; said frequency difference circuit including third switch means for passing third difference signal when said difference in frequency between said signals from said first and second sources is greater than said first preselected value and less than said second preselected value; and d. means responsive to said phase angle signal, said first output signal and said first or second difference signals to provide an indicating signal whenever said phase angle signal, said first output signal and said first or second difference signals are received.

4. An indicating system for indicating whenever a signal from a first alternating current source is synchronized with a signal from a second alternating current source, said system comprising:

a. a first storage cell responsive to the signals from said first and second sources to provide a first signal whenever the frequency of said signal from said first source is greater than frequency of said signal from said second source;

b. a second storage cell responsive to said frequency of said signals from said first and second sources to provide a second signal whenever the frequency of said signal from said first source is less than the frequency of said signal from said second source;

c. a third storage cell responsive to said first and second signals to provide a first output signal whenever said first signal is received, and a second output signal whenever said second signal is received; and d. a frequency discriminator circuit responsive to the signals from said first and second sources to sense a difference in frequency between said signals and for producing a first output signal when the frequency of the first source signal is higher than that of the second, and a second output signal when the frequency of the second source signal is higher than that of the first.

5. A control system for synchronizing a signal from a first alternating current source to a signal from a second alternating current source, said system comprising:

a. a frequency discriminator circuit responsive to the signals from said first and second sources to sense a difference in frequency between said signals and for producing a first output signal when the frequency of the first source signal is higher than that of the second, and a second output signal when the frequency of the second source signal is higher than that of the first;

b. an angle discriminator circuit responsive to the signals from said first and second sources to sense a phase angle difference and a frequency difference between said signals, and for generating a phase angle signal occurring during periods of time during which said phase angle difference is less than a predetermined value; said phase angle signal recurring at a rate proportional to said frequency difference between said signals;

c. a frequency difference circuit responsive to said recurring phase angle signals to sense a difference in frequency between the signals from said first and second sources, and including first switch means for passing a first difference signal whenever said difference in frequency between said signals from said first and second sources is less than a preselected value; and d. a first gating means responsive to said phase angle signal, said first output signal and said first difference signal to provide a synchronization signal for effecting connection of said first source to said second source.

6. A control system for synchronizing a signal from a first alternating current source to a signal from a second alternating current source, said system comprising:

a. a frequency discriminator circuit responsive to the signals from said first and second sources to sense a difference in frequency between said signals and for producing a first output signal when the frequency of the first source signal is higher than that of the second, and a second output signal when the frequency of the second source signal is higher than that of the first;

b. an angle discriminator circuit responsive to the signals from said first and second sources to sense a phase angle difference and a frequency difference between said signals, and for generating a phase angle signal occurring during periods of time during which said phase angle difference is less than a predetermined value; said phase angle signal recurring at a rate proportional to said frequency difference between said signals;

c. a frequency difference circuit responsive to said recurring phase angle signals to sense a difference in frequency between said signals from said first and second sources, and including first switch means for passing a first difference signal whenever said difference in frequency between said signals from said first and second sources is less than a first preselected value; second switch means for passing a second difference signal when said difference in frequency between said signals from said first and said second sources is greater than a second preselected value; third switch means for passing a third difference signal said difference in frequency between said signals from said first and second sources is greater than said first preselected value and less than said second preselected value; and d. a first gating means responsive to said phase angle signal, said first output signal and said first or said third difference signal to provide a synchronization signal for effecting connection of said first source to said second source.

7. A control system for synchronizing a signal from a first alternating current source to a signal from a second alternating current source, said system comprising:

a. a frequency discriminator circuit responsive to the signals from said first and second sources to sense a difference in frequency between said signals and for producing a first output signal when the frequency of the first source signal is higher than that of the second, and a second output signal when the frequency of the second source signal is higher than that of the first;

b. an angle discriminator circuit responsive to the signals from said first and second sources to sense a phase angle difference and a frequency difference between said signals, and for generating a phase angle signal occurring during periods of time during which said phase angle difference is less than a predetermined value; said phase angle signal recurring at a rate proportional to said frequency difference between said signals;

c. a frequency difference circuit responsive to said recurring phase angle signals to sense a difference in frequency between said signals from said first and second sources, and including first switch means for passing a first difference signal whenever said difference in frequency between said signals from said first and second sources is less than a first preselected value; second switch means for passing a second difference signal whenever said difference in frequency between said signals from said first and said second sources is greater than a second preselected value; third switch means for producing a third difference signal when said difference in frequency between said signals from said first and second sources is greater than said first preselected value and less than said second preselected value;

d. a first gating means having first and second states and being responsive to said phase angle signal, said first output signal and said first or said third difference signal to assume said first state and provide a synchronization signal for effecting connection of said first source to said second source, said first gating means assuming said second state to provide a nonsynchronization signal whenever said phase angle signal, said first output signal and said first or said third difference signals are not present;

e. a second gating means responsive to said second output signal and said nonsynchronization signal to initiate a first intermediary control signal;

f. a third gating means responsive to said second difference signal, said first output signal and said nonsynchronization signal to initiate a first control signal for causing said frequency of said signal from said first source to increase in a first direction;

g. a fourth gating means responsive to said first output signal, said first difference signal and said nonsynchronization signal to initiate a second intermediary control signal; and h. a fifth gating means responsive to said first and second intermediary control signals to initiate a second control signal for causing said frequency of said signal from said first source to increase in a second direction opposite to said first direction.

8. The control system as recited in claim 7 wherein said first alternating current source is a power generator and said second alternating current source is an operating power line.

9. The control system as recited in claim 8 wherein said power generator is a gas turbine generator.

10. The control system as recited in claim 7 wherein said frequency discriminator circuit comprises:

a. a first storage cell responsive to the signals from said first and second sources to provide a first signal whenever the frequency of said signal from said first source is greater than the frequency of said signal from said second source;

b. a second storage cell responsive to said frequency of said signals from said first and second sources to provide a second signal whenever the frequency of said signal from said first source is less than the frequency of said signal from said second source; and c. a third storage cell responsive to said first and second signals to provide a first output signal whenever said first signal is received, and a second output signal whenever said second signal is received.

11. The control system as recited in claim 7 wherein said angle discriminator circuit comprises:
 a. a first logic means responsive to said frequency of said signals from said first and second sources to produce a first intermediary signal having a pulse width representative of said phase angle difference between said frequencies;
 b. a first inverter circuit responsive to said first intermediary signal to generate an inverted first intermediary signal;
 c. a timing means responsive to said inverted first intermediary signal to generate a timing pulse having a pulse width representative of said predetermined value;
 d. a second inverter circuit, said second inverter circuit responsive to said timing pulse to generate an inverted timing pulse;
 e. second logic means responsive to said inverted timing pulse and said inverted first intermediary signal to produce a second intermediary signal whenever said pulse width of said inverted timing pulse is greater than said pulse width of said inverted first intermediary signal;
 f. third logic means responsive to said first intermediary signal and said timing pulse to generate a third intermediary signal whenever said pulse width of said first intermediary signal is greater than said pulse width of said timing pulse; and
 g. an angle discriminator storage cell, responsive to said second and said third intermediary signals to generate said phase angle signal whenever said pulse width of said first intermediary signal is less than said pulse width of said timing pulse.

12. The control system as recited in claim 7 wherein said frequency difference circuit comprises:
 a. first trigger means responsive to said phase angle signal to generate a read pulse;
 b. second trigger means responsive to said read pulse to generate a reset pulse;
 c. a first time delay means responsive to said reset pulse to produce first and second time delay signals;
 d. a second time delay means responsive to said reset pulse to produce third and fourth time delay signals;
 e. said first switch means responsive to said read pulse and said first time delay signal to produce said first difference signals whenever said difference in frequency between said signals from said first and said second sources is less than said first preselected value;
 f. said second switch means responsive to said read pulse and said third time delay signal to produce said second difference signal whenever said difference in frequency between said signals from said first and second sources is greater than said second preselected value; and
 g. said third switch means responsive to said read pulse, said second time delay signal and said fourth time delay signal to produce said third difference signal whenever said difference in frequency between said first and said second sources is greater than said first preselected value and less than said second preselected value.

13. The control system as recited in claim 12 wherein said first time delay signal has a polarity opposite that of said second time delay signal, and said third time delay signal has a polarity opposite that of said fourth time delay signal.

14. A frequency difference circuit for sensing a difference in frequency between signals from first and second alternating current sources, said circuit comprising:
 a. first trigger means responsive to a phase angle signal to generate a read pulse;
 b. second trigger means responsive to said read pulse to generate a reset pulse;
 c. a first time delay means responsive to said reset pulse to produce first and second time delay signals;
 d. a second time delay means responsive to said reset pulse to produce third and fourth time delay signals;
 e. a first switch means responsive to said read pulse and said first time delay signal to produce a first difference signal whenever said signals from said first and second sources is less than a first preselected value;
 f. a second switch means responsive to said read pulse and said third time delay signal to produce a second difference signal whenever said difference in frequency between said signals from said first and second sources is greater than a second preselected value; and
 g. a third switch means responsive to said read pulse, said second time delay signal and said fourth time delay signal to produce a third difference signal whenever said difference in frequency between said first and second sources is greater than said first preselected value and less than said second preselected value.

15. The control system as recited in claim 14 wherein said first time delay signal has a polarity opposite that of said second time delay signal, and said third time delay of signal has polarity opposite that of said fourth time delay signal.

* * * * *